Sept. 27, 1966  A. JACOBS  3,274,723
LICENSE PLATE HOLDER
Filed Jan. 28, 1964  3 Sheets-Sheet 1

INVENTOR.
ARTHUR JACOBS
BY Meyer A. Baskin
ATTORNEY.

Sept. 27, 1966  A. JACOBS  3,274,723
LICENSE PLATE HOLDER
Filed Jan. 28, 1964  3 Sheets-Sheet 2
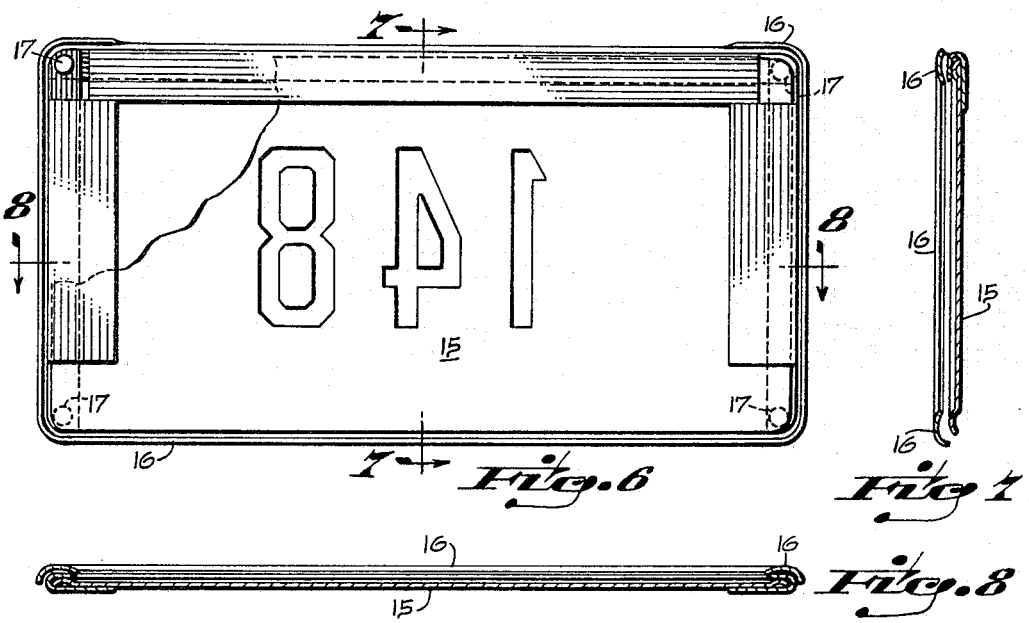
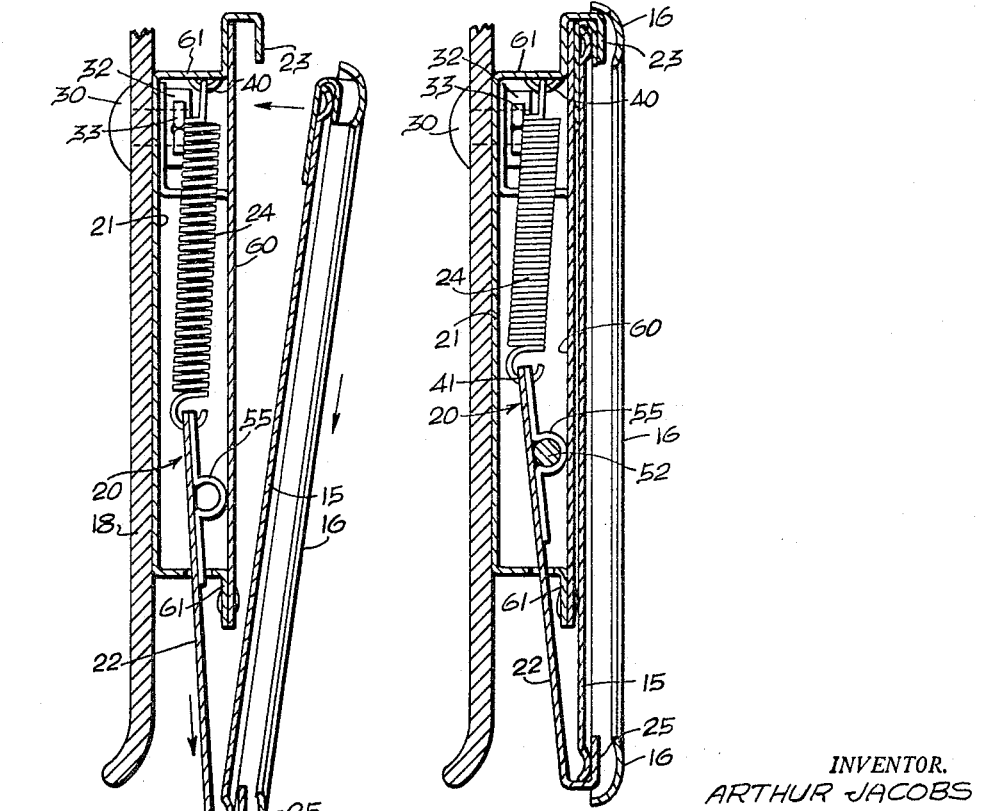
INVENTOR.
ARTHUR JACOBS
BY
ATTORNEY.

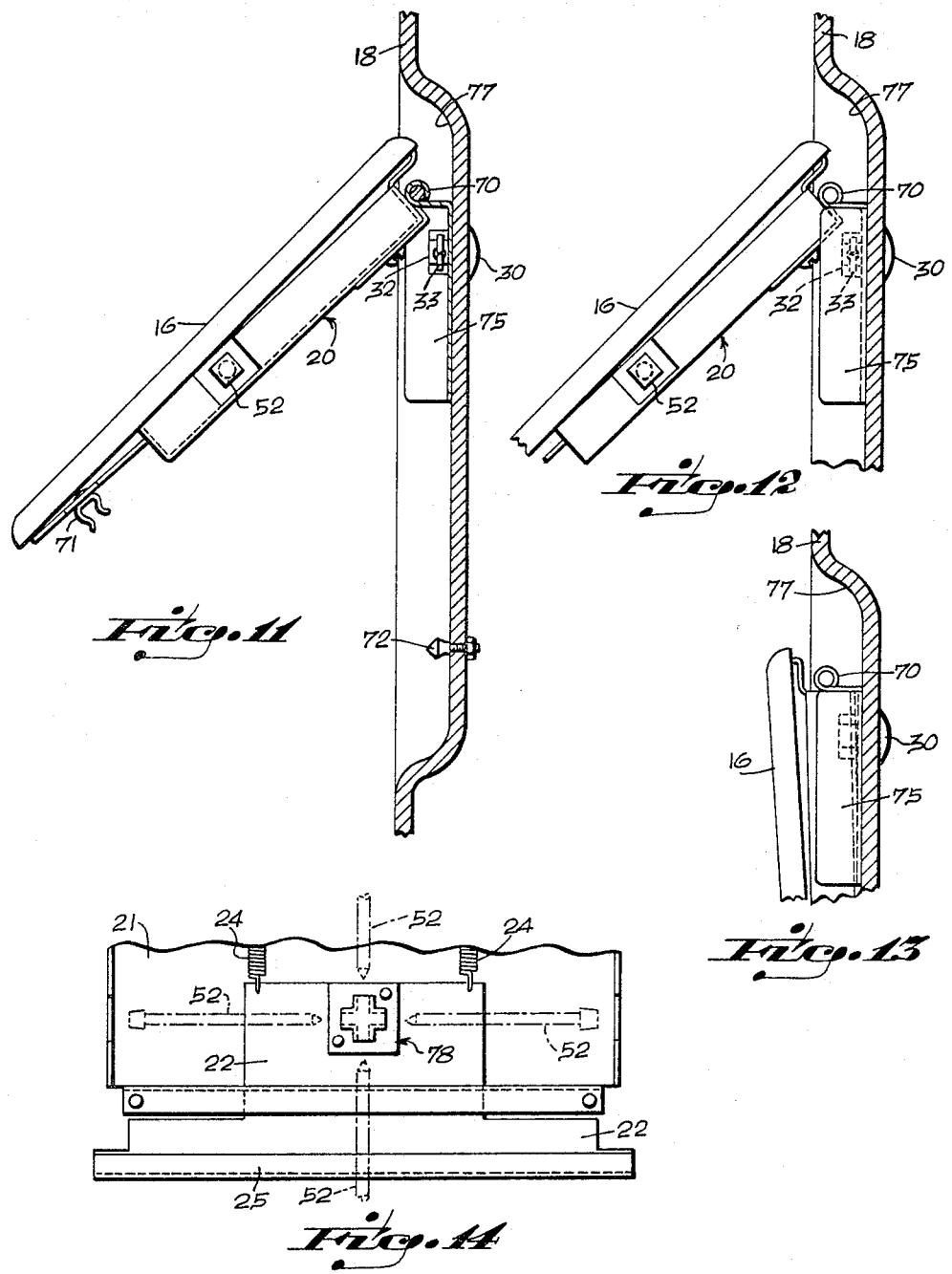

United States Patent Office 3,274,723
Patented Sept. 27, 1966

3,274,723
LICENSE PLATE HOLDER
Arthur Jacobs, 3575 SW. 23rd St., Miami, Fla.
Filed Jan. 28, 1964, Ser. No. 340,617
5 Claims. (Cl. 40—209)

This invention relates to improvements in license plate holders for automotive vehicles.

The principal object of this invention is to provide a novel, effective and inexpensive locking device for automobile license plate holders of the type such as are disclosed in my previous United States Patent No. 2,501,176, issued to me, Arthur Jacobs, on March 21, 1950, to which this improvement relates.

Another object is to provide an improved license plate holder which may be easily and readily mounted in the desired position and in which the license plate may be easily inserted and securely and positively maintained in proper level position.

A further object is to provide means for mounting a license plate in desired position so that the plate is rattle proof, silent, and free of vibration.

Yet another object is to provide a concealed theft-proof locking means for such an automotive vehicle license plate holder which prevents removal after mounting by an unauthorized person of either the holder from the vehicle or the plate from the holder.

A still further object of this invention is to provide a license plate holder for an automotive vehicle which requires a key to lock the license plate in desired position within the holder.

Another object of this invention is to provide a theft-proof locking device for the license plate and a novel arrangement of parts of the holder frame which prevents its removal from the vehicle after the frame and plate are completely assembled and attached to the vehicle.

Other objects and advantages of this invention will be readily understood from a reading of the following detailed description in connection with the accompanying drawings in which:

FIGURE 6 is a rear elevation of the rectangular border frame which surrounds the license plate and to which it is affixed before it is finally mounted in the plate holder.

FIGURE 7 is a vertical cross-sectional view taken along line 7—7 of FIGURE 6 looking in the direction indicated by the arrows.

FIGURE 8 is a horizontal cross-sectional view taken along the line 8—8 of FIGURE 6 looking in the direction indicated by the arrows.

FIGURE 9 is an enlarged detail vertical cross-sectional view of the license plate holder illustrating the license plate position in its surrounding border frame and shown with its lower edge of the lower piece of the two piece back part of the holder with the coil spring extended downwardly just prior to final assembly, and FIGURE 10 is an enlarged detail vertical cross-sectional view of the license plate holder, the same as FIGURE 9, except that it illustrates the parts in final assembled locked position with the upper edge of the border frame which carries the license plate engaging the upper edge of the piece of the two piece back part of the holder with the coil spring contracted and the locking bolt in final locked position.

FIGURE 11 is a cross-sectional view of a modified form of the license plate frame holder of this invention employing a hinge mounting for use in recessed bumpers illustrating the frame holder swung out in open position.

FIGURE 12 is a broken partial view similar to that of FIGURE 11 illustrating the guard edge in full plan view.

FIGURE 13 is a broken partial cross-sectional view showing the frame holder in closed locked operative position, and FIGURE 14 is a fragmentary rear view, partially diagrammatic, illustrating a modified form of lock bolt receiver.

Figure 1:
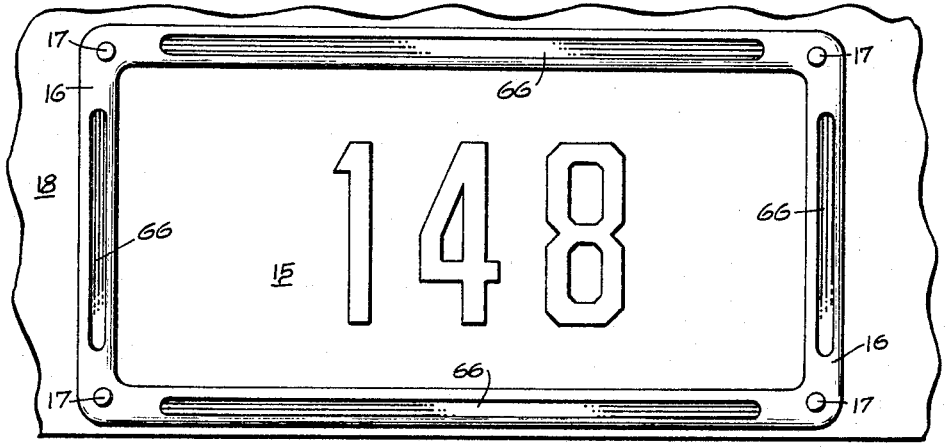
FIGURE 1 is a front view of a license plate holder made in accordance with this invention shown mounted to the bumper of an automotive vehicle with the license plate mounted and locked therein.

Referring now to the drawings in detail in which like reference numerals designate like parts throughout the several views, there is shown in FIGURE 1 a license plate or automotive vehicle identification tag 15 surrounded by and mounted in an outer border frame 16 by suitable corner screws or rivets 17.

The license plate 15 and its frame 16 are non-removably mounted in a securely locked and theft-proof manner to a front or rear bumper 18, or other desirable part of an automotive vehicle (not shown) as will hereinafter be described in detail.

The theft-proof locking mechanism of this license plate holder comprises a vertically disposed two piece back member indicated generally by the numeral 20, having an upper portion 21 and a lower portion 22 which are operatively and telescopically connected together by a pair of coil tension springs 24 as illustrated in FIGURES 2, 4, 5, 9 and 10. Said upper portion 21 having a horizontally disposed flange portion bent upon itself to form a vertically disposed U-shaped channel 23 with an open bottom for receiving the upper edge of the license plate 15.

The lower portion 22 of said two piece back member 20 has a horizontally disposed flange portion bent upon itself to form a vertically disposed U-shaped channel portion 25 with an open top for receiving the lower edge of the license plate 15.

The two piece back 20 of the license plate holder is fixedly attached to the automobile bumper 18 by a pair of bolts 30 which extend through slots 31 formed in said back and have nuts 32 which, together with bolts 30 are bored to receive cotter keys 33, the nuts 32 and cotter keys 33 being on the forward face of said two piece back 20.

The pair of vertically disposed coil springs 24 are secured at their respective upper ends at 40 to the U-shaped channel portion 23 of upper portion 21 of the two piece back 20 and are secured at their respective lower ends at 41 to the lower portion 22 of back 20 in a manner to urge said upper and lower portions toward each other together with their respective upper and lower channels 23 and 25. Thus the open ends of said channels 23 and 25, which are adapted to receive the top and bottom edges of license plate 15 clamp its top and bottom horizontal edges in desired position under strong spring tension as illustrated in the drawings, and in much the same general manner as that shown in my earlier issued United States Patent No. 2,501,176.

Figures 2, 4:
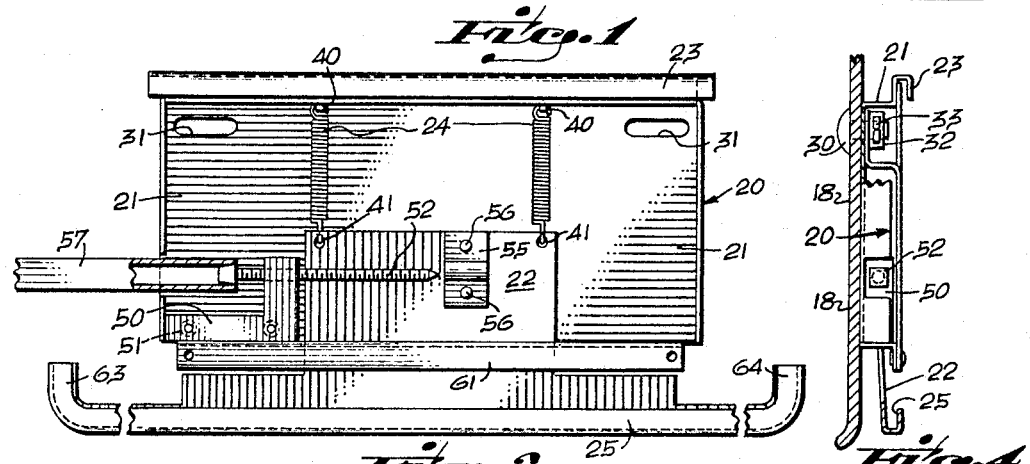
FIGURE 2 is a front elevation of the two piece back part of the plate holder which illustrates the coil springs which connect the upper and lower pieces together and illustrating the novel lock and key.
FIGURE 4 is a vertical cross-sectional view taken along the line 4—4 of FIGURE 3.

One form of the locking device of this invention shown for purposes of illustration, is adapted to retain the upper and lower portions 21, 22 of the back 20 of the plate holder against separation after they have been pulled together by the tension of the springs 24, includes L-shaped bracket 50 fixed to the upper portion 21 of back 20 by screws 51, welding or in any other suitable manner as clearly illustrated in FIGURES 2, 4 and 10 of the drawings. A horizontally disposed elongated lock bolt 52 is screw threadedly mounted through bracket so a U-shaped bolt receiving member 55 is fixed by spot welding, screws, or in any other suitable manner at 56 to the lower portion 22 of back 20, as shown in FIGURES 2 and 10, is in alignment with and adapted to receive the inner end of elongated lock bolt 52 as it is advanced by screw threading it inwardly, through the use of any suitable removable key 57, as shown in FIGURE 2.

A cover plate 60, see FIGURES 3, 4, 5, 9 and 10, is permanently and unremovably fixed to forward extensions 61 of the upper portion 21 of the two piece back 20 by rivets, screws, spot welding, or in any other suitable manner. This arrangement prevents access to any of the mounting bolts, screws, or other fastening devices and particularly protectively covers and prevents access to the lock mechanism by unauthorized persons.

Thus, it is readily seen that a completely theft-proof locking device is provided by the novel arrangement of parts and combination of elements which constitute this invention.

Figures 3, 5:
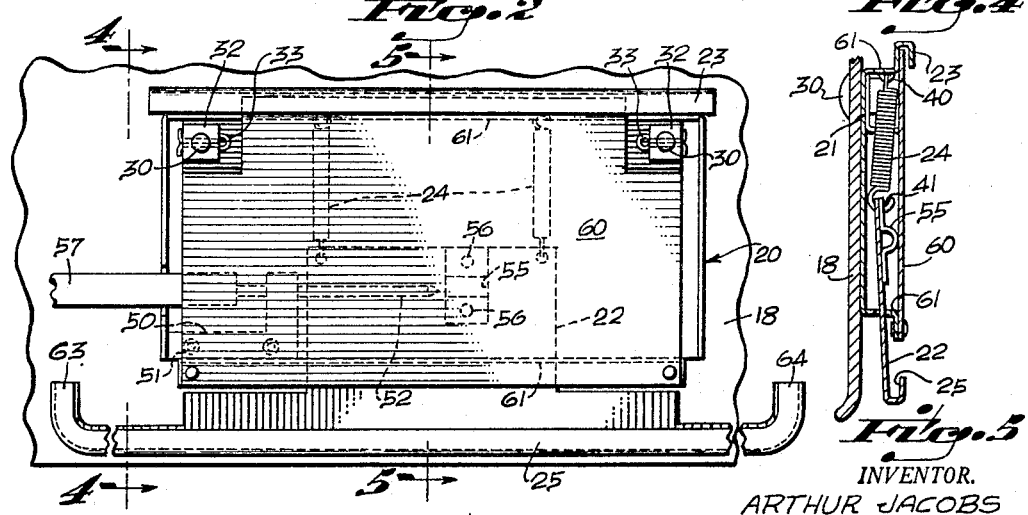
FIGURE 3 is a similar view of the two piece back part of the holder illustrating the cover for the locking mechanism, the outline of the novel lock being shown in dotted lines.
FIGURE 5 is a vertical cross-sectional view taken along the line 5—5 of FIGURE 3.

The assembly operation of this device is easy and quick to accomplish and is particularly well illustrated in FIGURES 9 and 10, taken with FIGURES 2 and 3. As shown in FIGURE 9, first, the lower part 22 of the back 20 is pulled down, relative to the upper back part 21 stretching and expanding the coil springs 24 downwardly as indicated by the arrow in FIGURE 9. Next the lower edge of the license plate 15 is inserted in the bottom slot formed by upturned lower edge 25 of the back 20. To perform these first two operations requires but a moment and it helps to swing the upper portion of assembly 20 outwardly to the position shown in FIGURE 9. The third and last maneuver is to move the assembly 20 inwardly as also indicated by another arrow in FIGURE 9 until the upper edge of license plate 15 is in alignment with the downturned upper slot formed by downturned upper edge 23 of the back and let the coil springs 24 snap the plate into slot engaging position as shown in FIGURE 10.

Thus the plate 15 is spring clamped securely in the final position shown in FIGURE 10, and held snugly in place, by the contracted springs 24, against rattling.

It should be noted as shown in FIGURES 2 and 3, that the outer ends of the lower edge 25 of the frame of the assembly are upturned at 63 and 64, to form side edge grooves around the side edges of the license plate holder for the purposes of preventing removal of the license plate in a sideways direction. Such side edges 63 and 64 may be provided at the upper edge of the frame to form downturned holding side members in lieu of having them at the lower edge or all four corners may be so formed if desired.

An additional feature of this invention is the provision of inlaid grooves 66 extending longitudinally in one or more edges of frame 16 if desired, see FIGURE 1, which may be painted or colored in any manner, gold anodized or otherwise decorated to add beauty to the frame. Car color matching or contrasts may be used in grooves 66 or safety light reflecting red or other color may be used.

A modified form of this invention is illustrated in FIGURES 11, 12, and 13. The only difference from the form just described is that the license plate holder 20 is hingedly mounted, as shown. This may be necessary where the bumper 18 of the automotive vehicle or other attaching service is recessed as many are today.

In this modified form the assembly 20 is mounted on a pair of hinges 70, or one long piano type hinge may be used. Hinges 70 are fastened to the bumper by bolts 30 having nuts 32, and cotter keys 33. Any other well known type of fastening device may be employed to hinge the license plate holder to bumper 18, either along the top edge as shown or along the bottom or side edges. A spring clip 71, fastened to the holder may be used to engage studs 72, as shown in FIGURE 11. This prevents rattling. Any other desired fastening means may be employed. Side members 75 are bent from the back to enclose the mechanism and prevent access by unauthorized persons. Any desired means may be utilized to unremovably fasten the hinged type of license plate holder.

In FIGURES 11, 12 and 13, the hinged assembly is shown in such a recessed bumper in both swung out position and closed in close proximity to the bumper 18, and lies within the recess 77 of bumper 18. All other parts are identical to the first described form.

In FIGURE 14 there is illustrated a modified lock bolt receiving member 78. This arrangement permits entrance of the screw threaded bolt rod 52 into the bolt receiving member 78 from any desired direction, from either side or from the top or bottom by providing four bolt receiving screw threaded holes in member 78 as shown.

One form of this invention has been specifically illustrated and described herein, however various changes are contemplated in the size, shape and particular arrangement of the parts while employing the spirit and principle of the invention and falling within the scope of the appended claims.

Referring to the means for fastening the holder to the bumper in the form of the invention shown in FIGURES 1 through 10, an alternative is the use of cotter keys 33, a short bolt similar to lock bolts 52 may be inserted through nuts 32 which would be suitably drilled and tapped to receive said short bolts. These bolts would have ends shaped to receive a key 57. It being understood that the ends of lock bolts 52 and the end of these short bolts could have any other shape besides square as shown in FIGURE 2 to receive a key 57, i.e. hexagonal or octagonal ends. In each device the key and bolt end would be the same for the long bolts 52 and said short bolts.

Another alternative method of locking the device to the car bumper to make it permanent is to have one or more holes drilled through each of nuts 32 to receive pins, not shown. Corresponding to these holes will be holes in extension 61 of cover plate 60 which would register with said holes in nuts 32. When said holes are in register a case hardened pin is driven through both holes and prevents nuts 32 from being removed.

Any other well-known fastening means commonly in use in the art may be used in combination with the novel locking means of my invention.

In the hinged form of this invention, shown in FIGURES 11 through 14, a spring hinge may be employed to prevent rattling.

It is obvious that when the license plate is assembled in its holder and finally mounted in operating position, as described, no mounting bolts are visible.

I claim:
1. The combination of a license plate, a surrounding frame and a holder therefor, said holder including a two-part back member wherein the upper part and lower parts of said back member are arranged to move slidably upwardly and downwardly in relation to each other in telescope fashion, clamping means extending lengthwise of the longitudinally extending top edge of the upper part of the back member, similar clamping means extending lengthwise of the longitudinally extending bottom edge of the lower part of the back member, said upper and lower clamping means adapted to receive and retain a license plate therebetween, spring means operatively associated with and connecting said upper and lower parts of the two part back member together in a manner to normally urge them to telescope slidably towards each other and draw their respective clamping means together whereby to cause a clamping action about the license plate and frame, a locking device comprising a longitudinally extending elongated screw threaded lock bolt rod, a bracket for said lock bolt rod which is fixed to the upper part of the back member and has a screw threaded bore therethrough adapted to screw threadedly receive said screw threaded rod, a lock bolt rod receiving member fixed to the lower part of the back member having a screw threaded bore therethrough which is in alignment with the bore of the lock bolt rod bracket and adapted to screw-threadedly receive said bolt rod, and a key for turning said lock bolt rod, said locking device locking the upper and lower parts of the back member and their respective clamping means immovably together.

2. A license plate frame and a holder therefor for an automotive vehicle, means to mount said holder and license plate frame to an automobile bumper, said holder having an upper clamping portion adapted to engage the upper edge of said frame and a lower clamping portion adapted to engage the lower edge of said frame, said upper and lower clamping portions being adapted to slidably move toward and away from each other, tension spring means arranged to normally urge said upper and lower clamping portions together, a two part locking device including an elongated screw threaded rod bolt, a support therefore fixed to the upper clamping portion having a screw threaded bore extending longitudinally therethrough and adapted to screw threadedly receive a rod bolt receiving member fixed to the lower clamping portion having a similar screw threaded bore extending longitudinally therethrough in alignment with the bore of the rod bolt support, and removable key means adapted to turn said screw threaded rod in a manner to engage and disengage the support and receiving member.

3. A license plate frame and holder therefor adapted to be mounted in the recess of a recessed automotive bumper, hinged means for mounting said holder and license plate frame in said bumper recess, said holder having an upper clamping portion adapted to engage the upper edge of said frame and a lower clamping portion adapted to engage the lower edge of said frame, said upper and lower clamping portions being adapted to slidably move toward and away from each other, tension spring means arranged to normally urge said upper and lower clamping portions together, a two part locking device, one part fixed to the lower clamping portion and the other part fixed to the upper clamping portion of the holder, an elongated bolt adapted to operatively engage and connect both parts of said locking device in a manner to prevent relative movement between the upper said lower clamping portions, the mounting means including a back mounting plate adapted to be bolted to the recessed portion of the automobile bumper, a hinge fixed along the upper edge of said back mounting plate and along the upper edge of the holder in a manner to hingedly connect the holder to the bumper and permit it to be swung outwardly from said recessed portion of the bumper.

4. A license plate frame and holder therefor adapted to be mounted in the recess of a recessed automotive bumper as described in claim 3, having a spring clip member mounted adjacent the lower portion of the holder, a spring clip receiving member fixed within the recess of the bumper in alignment with and adapted to receive said spring clip in snug holding relation in a manner to retain the license holder in vertical rattleproof relationship with the bumper.

5. A license plate frame and holder therefor adapted to be mounted in the recess of a recessed automotive bumper as described in claim 3 including means to lock the holder to the bumper in vertical position thereon.

References Cited by the Examiner
UNITED STATES PATENTS

| | | | |
|---|---|---|---|
| 1,898,024 | 2/1933 | Von Hacht | 40—209 |
| 2,350,993 | 6/1944 | Aigner | 40—209 |
| 2,501,176 | 3/1950 | Jacobs | 40—209 |

EUGENE R. CAPOZIO, *Primary Examiner.*

HERBERT F. ROSS, *Examiner.*